(12) United States Patent
Levine (10) Patent No.: US 12,144,018 B2
(45) Date of Patent: Nov. 12, 2024

(54) DYNAMIC CONFIGURATION OF DEVICES USING ENCUMBERED SHARED SPECTRUM

(71) Applicant: CHARTER COMMUNICATIONS OPERATING, LLC, St. Louis, MO (US)

(72) Inventor: Jonathan Michael Levine, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 506 days.

(21) Appl. No.: 17/381,309

(22) Filed: Jul. 21, 2021

(65) Prior Publication Data

US 2023/0035635 A1 Feb. 2, 2023

(51) Int. Cl.
| | |
|---|---|
| *H04W 72/10* | (2009.01) |
| *H04W 16/14* | (2009.01) |
| *H04W 72/04* | (2023.01) |
| *H04W 72/0453* | (2023.01) |
| *H04W 72/06* | (2009.01) |
| *H04W 72/56* | (2023.01) |
| *H04W 72/563* | (2023.01) |

(52) U.S. Cl.
CPC ........... *H04W 72/56* (2023.01); *H04W 16/14* (2013.01); *H04W 72/0453* (2013.01); *H04W 72/563* (2023.01)

(58) Field of Classification Search
CPC . H04W 16/14; H04W 72/0453; H04W 72/56; H04W 72/563
See application file for complete search history.

(56) References Cited

U.S. PATENT DOCUMENTS

| | | |
|---|---|---|
| 5,991,308 A | 11/1999 | Fuhrmann et al. |
| 5,995,499 A | 11/1999 | Hottinen et al. |
| 6,154,648 A | 11/2000 | Comer |

(Continued)

FOREIGN PATENT DOCUMENTS

| | | |
|---|---|---|
| EP | 2294860 B1 | 4/2017 |
| EP | 3741168 A1 | 11/2020 |

(Continued)

OTHER PUBLICATIONS

IEEE Std. 802.11 (1997), or related standards including 802.11 a/b/g/n/s/v/ac/ad/ax/ay/ba or 802.11-2012/2013, 802.11-2016, 459 pages.
Palola M., et al., "Field Trial of the 3.5 GHz Citizens Broadband Radio Service Governed by a Spectrum Access System (SAS)," IEEE International Symposium on Dynamic Spectrum Access Networks, 2017, 9 pages.

(Continued)

*Primary Examiner* — Awet Haile
(74) *Attorney, Agent, or Firm* — Patent Beach PC (57) ABSTRACT

Various embodiments comprise systems, methods, and apparatus for enabling dynamic configuration of devices using encumbered shared spectrum (e.g., CBSDs using CBRS) so as to operate these devices in accordance with a most preferred operator preference of a plurality of operator preferences currently available in view of current wireless operating conditions, such as impacted by overlapping/proximate incumbent or priority users of the shared spectrum, or other changes in spectrum available conditions. Various embodiments further provide for an efficient return of these devices to a most preferred operator preference or steady-state configuration.

20 Claims, 2 Drawing Sheets

(56) References Cited

U.S. PATENT DOCUMENTS

| | | |
|---|---|---|
| 6,356,560 B1 | 3/2002 | Venters et al. |
| 6,771,953 B1 | 8/2004 | Chow et al. |
| 6,782,262 B1 | 8/2004 | Lundborg |
| 7,266,726 B1 | 9/2007 | Ladd et al. |
| 8,024,607 B2 | 9/2011 | Ladd et al. |
| 8,046,636 B2 | 10/2011 | Ladd et al. |
| 8,302,111 B2 | 10/2012 | Ladd et al. |
| 8,321,723 B2 | 11/2012 | Ladd et al. |
| 8,799,723 B2 | 8/2014 | Ladd et al. |
| 8,997,136 B2 | 3/2015 | Brooks et al. |
| 9,258,809 B2 | 2/2016 | Liao et al. |
| 9,386,496 B2 | 7/2016 | Gupta et al. |
| 9,526,056 B2 | 12/2016 | Tomici et al. |
| 9,699,663 B1 | 7/2017 | Jovancevic |
| 9,769,692 B2 | 9/2017 | Freda et al. |
| 9,807,778 B2 | 10/2017 | Ma et al. |
| 9,813,148 B2 | 11/2017 | Syed et al. |
| 9,887,864 B1 | 2/2018 | Han et al. |
| 10,098,568 B2 | 10/2018 | Gazdzinski |
| 10,135,730 B2 | 11/2018 | Chou |
| 10,340,976 B2 | 7/2019 | Kakinada et al. |
| 10,405,192 B2 | 9/2019 | Kakinada et al. |
| 10,484,876 B2 | 11/2019 | Shah et al. |
| 10,492,204 B2 | 11/2019 | Kakinada et al. |
| 10,499,409 B2 | 12/2019 | Shattil |
| 10,506,456 B2 | 12/2019 | Lou et al. |
| 10,531,309 B1 | 1/2020 | Li et al. |
| 10,536,859 B2 | 1/2020 | Gunasekara et al. |
| 10,680,883 B2 | 6/2020 | Hall et al. |
| 10,805,562 B2 | 10/2020 | Nakamura et al. |
| 10,980,025 B2 | 4/2021 | Hmimy et al. |
| 11,026,205 B2 | 6/2021 | Hmimy et al. |
| 11,129,171 B2 | 9/2021 | Hmimy |
| 11,190,861 B2 | 11/2021 | Bali |
| 11,219,026 B2 | 1/2022 | Kakinada et al. |
| 11,363,466 B2 | 6/2022 | Khalid et al. |
| 11,432,284 B2 | 8/2022 | Hmimy et al. |
| 11,438,771 B2 | 9/2022 | Syed et al. |
| 11,457,485 B2 | 9/2022 | Khalid et al. |
| 11,483,715 B2 | 10/2022 | Sevindik et al. |
| 2002/0046037 A1* | 4/2002 | Ausubel .............. G06Q 40/03 705/37 |
| 2002/0126748 A1 | 9/2002 | Rafie et al. |
| 2004/0001021 A1 | 1/2004 | Choo et al. |
| 2004/0196834 A1 | 10/2004 | Ofek et al. |
| 2006/0188004 A1 | 8/2006 | Kizu et al. |
| 2008/0097913 A1 | 4/2008 | Dicks et al. |
| 2008/0220786 A1 | 9/2008 | Beacham |
| 2008/0220788 A1 | 9/2008 | Stanwood et al. |
| 2009/0034443 A1 | 2/2009 | Walker et al. |
| 2009/0129273 A1 | 5/2009 | Zou |
| 2009/0253438 A1 | 10/2009 | Chater-Lea et al. |
| 2010/0094956 A1 | 4/2010 | Zuckerman et al. |
| 2010/0128608 A1 | 5/2010 | Zou et al. |
| 2010/0234042 A1 | 9/2010 | Chan et al. |
| 2011/0014924 A1 | 1/2011 | Hwang et al. |
| 2011/0292970 A1 | 12/2011 | Lansford et al. |
| 2013/0122903 A1 | 5/2013 | Farnsworth et al. |
| 2013/0182602 A1 | 7/2013 | Lee et al. |
| 2013/0281092 A1 | 10/2013 | Gassend |
| 2013/0288675 A1 | 10/2013 | Gassend |
| 2013/0303145 A1 | 11/2013 | Harrang et al. |
| 2013/0315124 A1 | 11/2013 | Rapaport et al. |
| 2013/0336175 A1 | 12/2013 | Um et al. |
| 2014/0106672 A1 | 4/2014 | Jeon et al. |
| 2014/0194068 A1 | 7/2014 | Coppage et al. |
| 2014/0241187 A1 | 8/2014 | Barkay et al. |
| 2014/0269526 A1 | 9/2014 | Mitola, III |
| 2014/0308986 A1 | 10/2014 | Yang et al. |
| 2015/0055623 A1 | 2/2015 | Li et al. |
| 2015/0071239 A1 | 3/2015 | Zhang et al. |
| 2015/0208262 A1 | 7/2015 | Siomina |
| 2015/0280847 A1 | 10/2015 | Somasundaram et al. |
| 2015/0334664 A1 | 11/2015 | Sawai et al. |
| 2015/0341753 A1 | 11/2015 | Chen et al. |
| 2016/0007147 A1 | 1/2016 | Zhang et al. |
| 2016/0073259 A1 | 3/2016 | Lee et al. |
| 2016/0128001 A1 | 5/2016 | Tsuda |
| 2016/0165066 A1 | 6/2016 | Yang et al. |
| 2016/0182134 A1 | 6/2016 | Kol et al. |
| 2016/0212031 A1 | 7/2016 | Jain et al. |
| 2016/0234746 A1 | 8/2016 | Gopal et al. |
| 2016/0330743 A1 | 11/2016 | Das et al. |
| 2016/0381600 A1 | 12/2016 | Aksu |
| 2017/0013422 A1 | 1/2017 | Saiwai et al. |
| 2017/0026203 A1 | 1/2017 | Thomas et al. |
| 2017/0155703 A1 | 6/2017 | Hao et al. |
| 2017/0164326 A1 | 6/2017 | Worrall |
| 2017/0208540 A1 | 7/2017 | Egner et al. |
| 2017/0257750 A1 | 9/2017 | Gunasekara et al. |
| 2017/0272955 A1 | 9/2017 | Sadek et al. |
| 2017/0295497 A1 | 10/2017 | MacMullan et al. |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple et al. |
| 2017/0318472 A1 | 11/2017 | Yu et al. |
| 2018/0007587 A1 | 1/2018 | Feldman et al. |
| 2018/0049036 A1 | 2/2018 | Sethi et al. |
| 2018/0063736 A1 | 3/2018 | Sadeghi et al. |
| 2018/0063758 A1 | 3/2018 | Velu |
| 2018/0115903 A1 | 4/2018 | Badic et al. |
| 2018/0124613 A1 | 5/2018 | Kang et al. |
| 2018/0132112 A1 | 5/2018 | Khoshnevisan et al. |
| 2018/0146058 A1 | 5/2018 | Somayazulu et al. |
| 2018/0146408 A1 | 5/2018 | Meylan et al. |
| 2018/0167948 A1 | 6/2018 | Egner et al. |
| 2018/0199214 A1 | 7/2018 | Shen |
| 2018/0234403 A1 | 8/2018 | Casella et al. |
| 2018/0235007 A1 | 8/2018 | Gou et al. |
| 2018/0242184 A1 | 8/2018 | Yerramalli et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0323938 A1 | 11/2018 | Takeda et al. |
| 2018/0352386 A1 | 12/2018 | Gunasekara et al. |
| 2019/0021012 A1 | 1/2019 | Beck et al. |
| 2019/0028182 A1 | 1/2019 | Smyth et al. |
| 2019/0037480 A1 | 1/2019 | Sun et al. |
| 2019/0037537 A1* | 1/2019 | Hassan ............... H04W 72/04 |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104551 A1 | 4/2019 | Deenoo et al. |
| 2019/0150182 A1 | 5/2019 | Koorapaty et al. |
| 2019/0159176 A1* | 5/2019 | Barton ............... H04W 72/04 |
| 2019/0182895 A1 | 6/2019 | Di Girolamo et al. |
| 2019/0222266 A1 | 7/2019 | Cui et al. |
| 2019/0230613 A1 | 7/2019 | Kim et al. |
| 2019/0239190 A1 | 8/2019 | Patel et al. |
| 2019/0296789 A1 | 9/2019 | Yu et al. |
| 2019/0319814 A1 | 10/2019 | Das |
| 2019/0320490 A1 | 10/2019 | Liu et al. |
| 2019/0349848 A1 | 11/2019 | Bali |
| 2019/0364565 A1 | 11/2019 | Hmimy et al. |
| 2019/0373615 A1 | 12/2019 | Cimpu et al. |
| 2019/0393926 A1 | 12/2019 | Kakinada et al. |
| 2019/0394790 A1 | 12/2019 | Damnjanovic et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0083892 A1 | 3/2020 | Kundu et al. |
| 2020/0084759 A1 | 3/2020 | Liu et al. |
| 2020/0146058 A1 | 5/2020 | Xu et al. |
| 2020/0178097 A1* | 6/2020 | Lee .................... H04W 24/08 |
| 2020/0187150 A1 | 6/2020 | Eisner |
| 2020/0221392 A1 | 7/2020 | Xue et al. |
| 2020/0228993 A1 | 7/2020 | Gunasekara et al. |
| 2020/0252933 A1 | 8/2020 | Hmimy et al. |
| 2020/0275457 A1 | 8/2020 | Hmimy |
| 2020/0344515 A1 | 10/2020 | Wong et al. |
| 2021/0026711 A1 | 1/2021 | Ovadia et al. |

(56) References Cited

U.S. PATENT DOCUMENTS

| | | |
|---|---|---|
| 2021/0051653 A1 | 2/2021 | Park et al. |
| 2021/0076424 A1 | 3/2021 | Mukherjee et al. |
| 2021/0126662 A1 | 4/2021 | Solichien |
| 2021/0127423 A1 | 4/2021 | Park et al. |
| 2021/0136838 A1 | 5/2021 | Khalid et al. |
| 2021/0204322 A1 | 7/2021 | Lou et al. |
| 2021/0219143 A1 | 7/2021 | Khalid et al. |
| 2021/0219303 A1 | 7/2021 | Khalid et al. |
| 2021/0235495 A1 | 7/2021 | Xu et al. |
| 2021/0258868 A1 | 8/2021 | Wong et al. |
| 2021/0266914 A1 | 8/2021 | Yoo et al. |
| 2021/0274499 A1 | 9/2021 | Hmimy et al. |
| 2021/0274506 A1 | 9/2021 | Raghavan et al. |
| 2021/0297979 A1 | 9/2021 | Hmimy et al. |
| 2021/0376905 A1 | 12/2021 | Zhou et al. |
| 2022/0007374 A1 | 1/2022 | Sevindik et al. |
| 2022/0060904 A1* | 2/2022 | Das ............... H04W 48/18 |
| 2022/0167176 A1 | 5/2022 | Khalid |
| 2022/0183093 A1 | 6/2022 | Sevindik et al. |
| 2022/0191675 A1 | 6/2022 | Mukherjee |
| 2023/0362970 A1* | 11/2023 | Furuichi ........... H04W 72/1215 |

FOREIGN PATENT DOCUMENTS

| | | |
|---|---|---|
| GB | 2585394 A | 1/2021 |
| JP | 2021510973 A | 4/2021 |
| KR | 20140070528 A | 6/2014 |
| WO | WO-2013020599 A1 | 2/2013 |
| WO | WO-2017130494 A1 | 8/2017 |
| WO | WO-2017186294 A1 | 11/2017 |
| WO | WO-2019140461 A1 | 7/2019 |
| WO | WO-2019226838 A1 | 11/2019 |
| WO | WO-2020160403 A1 | 8/2020 |
| WO | WO-2021050957 A1 | 3/2021 |
| WO | WO-2021067810 A1 | 4/2021 |
| WO | WO-2021086986 A1 | 5/2021 |

OTHER PUBLICATIONS

Souryal, Michael R., et al., "Effect of Federal Incumbent Activity on CBRS Commercial Service", International Symposium on Dynamic Spectrum Access Networks (DySPAN), IEEE 2019, 5 pages.
Wi-Fi Direct, "Wi-Fi Peer-to-Peer (P2P) Specification," Wi-Fi Alliance, Version 1.5, 2014, 183 pages.

* cited by examiner

DYNAMIC CONFIGURATION OF DEVICES USING ENCUMBERED SHARED SPECTRUM

FIELD OF THE DISCLOSURE

The present disclosure generally relates to wireless communications systems and related networks, and more particularly to dynamically updating radio node configurations to a highest priority configuration available in response to current spectrum encumbrance conditions.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Wireless operators, such as operators of mobile systems using Universal Mobile Telecommunications Systems (UMTSs), Long Term Evolution (LTE), and 5th Generation New Radio (5G-NR) described and being developed by the Third Generation Partnership Project (3GPP), are increasingly relying on wireless macrocell radio access networks (RANs) such as traditional cellular base stations, eNodeBs and the like, along with wireless small cell or microcell RANs in order to support numerous voice and data services. Increasing demands for wireless throughput make access to additional wireless spectrum desirable, including both licensed and unlicensed spectrum, spectrum in multiple spectral regions, such as high bands (24 GHz-40 GHz for 5G), mid bands (3.5 GHz-6 GHz and/or 1 GHz-2.6 GHz for 4G/LTE/5G), and low bands (<1 GHz for 4G/LTE/5G), and other shared spectrum.

Shared spectrum usage rules typically contemplate 3-tiered shared access; namely, (1) Incumbent operations, (2) Priority Access Licenses (PAL) which are used for commercial operation, and (3) General Authorized Access (GAA) which is available without licenses and subject to FCC Part 96 rules. For example, spectrum associated with citizens broadband radio service (CBRS) is currently configured as a 150 MHz band between 3.55 GHz and 3.70 GHz. Access is granted to Citizens Broadband Radio Service Devices (CBSDs) such as base stations, eNBs, gNBs, user devices and the like operating according to a GAA from ~3.55 GHz to 3.70 GHz, and PAL of up to ~70 MHz within the 3.55 GHz to 3.65 GHz operating range (possibly the 3.45 GHz-3.55 GHz region in the future). GAA compliance may at times require a reduction in transmit power/range of CBSDs functioning as base stations/eNBs/gNBs, such as when a GAA-define prioritized user requires this spectrum, which reductions may impact network operations in a manner causing non-seamless delivery of network services to user equipment (UE).

A Spectrum Access System (SAS) administrator in the case of CBSDs using CBRS spectrum, manages the communication to the Radio Access Network (RAN) during events of higher priority operations causing channel encumbrance. The SAS provides messaging to the RAN nodes indicating the requirement(s) to cease transmission, reduce transmit power, or move to another channel. At this point, radio nodes in the RAN must comply with the messaging, but the actual configuration adjustment is subjective, inefficient, and often results in a lingering state of inefficient or suboptimal CBSD operation for a wireless operator.

SUMMARY

Various deficiencies in the prior art are addressed by systems, methods, and apparatus for enabling dynamic configuration of devices using encumbered shared spectrum (e.g., CBSDs using CBRS) so as to operate these devices in accordance with a most preferred operator preference of a plurality of operator preferences currently available in view of current wireless operating conditions, such as impacted by overlapping/proximate incumbent or priority users of the shared spectrum, or other changes in spectrum available conditions. Various embodiments further provide for an efficient return of these devices to a most preferred operator preference or steady-state configuration.

A method for dynamically configuring wireless devices using encumbered spectrum according to one embodiment comprises: establishing, for a radio node configured to use encumbered spectrum, a priority ranking of radio channel configurations (RCCs); granting encumbered spectrum for use by the radio node in accordance with a default RCC; in response to a current spectrum encumbrance condition, determining a current highest priority RCC for the radio node capable of supporting radio node operation in accordance with the current encumbrance condition; granting encumbered spectrum for use by the radio node in accordance with the determined highest priority RCC; and periodically determining a current highest priority RCC for the radio node capable of supporting radio node operation in accordance with a current encumbrance condition, and granting encumbered spectrum for use by the radio node in accordance with the determined highest priority RCC. The radio node may be configured to update its use of unencumbered spectrum without being initialized or powered down.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features, but not to others. Those skilled in the art and informed by the teachings herein will realize that the invention is also applicable to various other technical areas or embodiments.

Various deficiencies in the prior art are addressed by systems, methods, and apparatus for enabling dynamic configuration of devices using encumbered shared spectrum (e.g., CBSD using CBRS) so as to operate these devices in accordance with a most preferred operator preference of a plurality of operator preferences currently available in view of current wireless operating conditions, such as impacted by overlapping/proximate incumbent or priority users of the shared spectrum, or other changes in spectrum available conditions. Various embodiments further provide for an efficient return of these devices to a most preferred operator preference or steady-state configuration. Shared spectrum usage rules typically contemplate 3-tiered shared access; namely, (1) Incumbent operations, (2) Priority Access Licenses (PAL) which are used for commercial operation, and (3) General Authorized Access (GAA) which is available without licenses and subject to FCC Part 96 rules. The various embodiments are directed toward managing the radio configuration and use of PAL/GAA based on the dynamic behavior of the Incumbent Operation.

Figure 1:
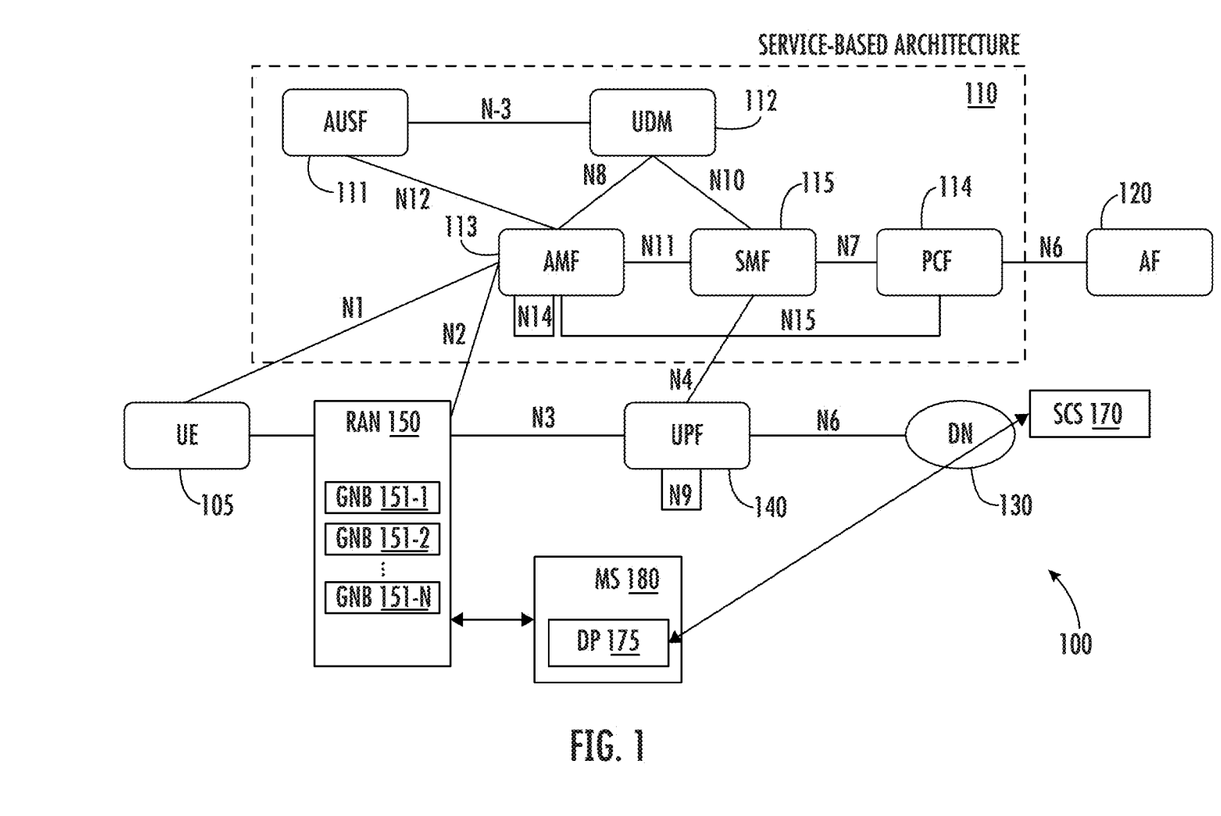
FIG. 1 depicts a service-based architectural representation of a 5G network including radio access nodes (RANs) operating in accordance with various embodiments.

FIG. 1 graphically depicts a communications network including radio access nodes (RANs) configured in accordance with various embodiments. The communications network 100 of FIG. 1 comprises, illustratively, a core network 110 supporting network services delivery to user equipment (UE) 105 via one or more RANs 150 deployed as part of a mobile network, a fixed wireless network, or some other network topology or combination of network topologies.

Specifically, FIG. 1 depicts a service-based architectural representation of a core network 110, illustratively a 5G core network comprising a number of core network functions (NFs) such as described in relevant standards documents such as the 3GPP standards for 5G (e.g. 3GPP 23.501 and 23.502), illustratively an authentication server function (AUSF) 111, a unified data management (UDM) 112 (having a unified data repository or UDR), an access and mobility function (AMF) 113, a policy control function (PCF) 114, and a service management function (SMF) 115. A plurality of interfaces or reference points N1 through N15 shown in FIG. 1 may define the communications and/or protocols between each of the entities, as described in the relevant (evolving) standards documents. One or more application functions, such as an application function (AF) 120, may connect to the 5G mobile network via PCF 114. One or more data networks (DN) 130 having application servers (AS) may be connected to the 5G mobile network through UPFs such as UPF 140. UPF 140 is part of the user plane, whereas the other NFs (e.g., AMF 113, SMF 115, PCF 114, AUSF 111, and UDM 112) are part of the control plane. Separating user and control planes guarantees that each plane resource to be scaled independently, and for UPFs 140 to be deployed separately from CP functions in a distributed fashion. The NFs in the CP may be modularized functions; for example, AMF and SMF may be independent functions allowing for independent evolution and scaling.

The UE 105 may comprise any suitable type of device, such as cellular phones, smart phones, tablet devices, Internet of Things (IoT) devices, machine-to-machine (M2M) communication devices, and so on. The number of UE 105 is only limited by the features/capabilities of the many and sometimes differently configured gNB instances within each of many deployed RAN 150.

Various UE 105 may obtain access to a 5G network core 110 (or other network core 110 such as a 3G or 4G/LTE) via gNB 151 formed as logical nodes or groupings of resources at a radio access network (R)AN or RAN 150, depicted as gNB 151-1 through 151-N (collectively gNB 151).

In accordance with various embodiments, it is contemplated that at least some of the RAN 150 comprise base stations, eNBs, gNBs, wireless small cells, microcells and the like (depending upon whether a 3G, 4G/LTE, 5G or other network is used) configured to provide voice, data, and/or other network services to UE 105 via tiered-access shared spectrum including licensed spectrum, unlicensed spectrum, or a combination of licensed and unlicensed spectrum. The RAN 150 may, in various embodiments, include mid-band (e.g., 3.5 GHz) gNBs, low-band (e.g., under 1 GHz) gNBs, or a combination of mid-band and low-band gNBs. That is, the various embodiments are suitable for use with numerous types of radio nodes, such as 4G LTE eNodeBs, 5G-NR gNodeBs, or any other type of wireless transmitting base station using tiered-access shared spectrum radio spectrum to transmit information as described herein.

The various gNB 151 formed at the RAN 150 may be configured with more or fewer resources of the RAN 150 so at to have features and/or capabilities selected in response to the type and number of UE connected to the RAN 150, the type of services being provided thereby, and so on.

The features/capabilities of gNB 151 may be expressed as, illustratively, a number of antennae allocated to a gNB, a gNB deployment type (e.g., tower based, strand-based, attached-based, indoor-small business, fixed wireless access, etc.), a backhaul type, a maximum supported user capacity, hardware capability information, software capability information, and/or other information suitable for use in describing gNB supported features and/or capabilities. Further, there are numerous traffic types and device types served by gNB, and each traffic type and/or device type has associated with it various and sometimes differing sets of service requirements such as down link (DL) data speed (DL throughput), up link (UL) data speed (UL throughput), DL data transmission latency, UL data transmission latency, and so on.

A Spectrum Coordination System (SCS) 170, such as a Spectrum Access System (SAS) administrator in the case of CBSDs using CBRS spectrum, manages the communication to the Radio Access Network (RAN) during events of higher priority operations causing channel encumbrance. The SCS 170 provides messaging directly or via a Domain Proxy (DP) 175 to RAN nodes 150 indicating the requirement(s) to cease transmission, reduce power, or move to another channel. At this point, a radio node in the RAN must comply with the messaging, but the actual configuration adjustment is subjective, inefficient, and often results in a lingering state of inefficient or suboptimal CBSD operation for a wireless operator.

As depicted in FIG. 1, the DP 175 is implemented as part of the MS 180 and communicating with the SCS 170 via the DN 130. In various other embodiments, the DP 175 may be implemented as a plurality of DSs operable to communicate with respective ones of a plurality of SCSs 170, or as one or more stand-alone DPs 170 instantiated/implemented outside of the MS 180.

Thus, SCS 170 when implemented as a SAS is configured to control access to the CBRS frequency band for RAN 150, gNB 151, UE 105 and other CBSD devices. Generally speaking, SCS/SAS 170 is configured to ensure that tiered-access spectrum, such as CBRS wireless spectrum, is allocated as a shared spectrum resource for wireless operators for CBSD use, and that such use is adapted government requirements, network congestion, network interference and the like. The sharing structure includes dynamic scenarios in which portions of the spectrum are encumbered and restricted for use temporarily from time to time. One such scenario is activation of a Dynamic Protection Area (DPA). During DPA-Activation, commercial wireless operations must cease radio transmission on certain channels, reduce power on such channels, and/or move to other available channels.

Various embodiments contemplate systems, methods, mechanisms and the like configured to define and utilize a Radio Channel Configuration Priority Preference (RCCPP) table for RAN 150, gNB 151 and the like, which table may be maintained at provider equipment (PE) in or interfacing with the radio access network RAN 150, illustratively a management system 180 or similar entity configured to communicate with the RAN 150 and/or other functional elements to perform various functions in accordance with the embodiments. The MS 180 may comprise a network management system (NMS), element management system (EMS), Operations Support System (OSS), or other management system, functional element, or portion thereof suitable for use in performing various functions in accordance with the embodiments.

Broadly speaking, various embodiments contemplate that the MS 180 automatically assesses conditions communicated by the SCS 170 with respect to particular radio node such as a RAN 150, gNB 151, eNB and the like (e.g., SAS messages transmitted thereto) and generates output indicative of a corresponding preferred or optimal radio node configuration. The preferred or optimal radio node configuration may be based on a network operator's channel strategy, radio node capabilities, customer service level agreement (SLA) requirements, and/or other criteria. The various embodiments are applicable to any shared access spectrum system, not only CBRS related systems.

A network operator or other entity may define a Radio Channel Configuration Priority Preference (RCCPP) table for each individual or type of RAN 150, gNB 151, eNB or other radio node or device using tiered-access spectrum. In various embodiments, the RCCPP table includes, in order of preference or priority, respective pluralities or groups of input classifications which may be used to reconfigure the radio node or device in the event of a need to avoid interfering with an incumbent or priority user of tiered-access spectrum that is currently encumbering (or scheduled to encumber) such tiered-access spectrum. The RCCPP table provides a list of radio node configurations in order of preference so that the radio node being reconfigured may operate in a "most preferred" manner with respect to the encumbered tiered-access spectrum.

An exemplary RCCPP table is provided below, which table uses input classifications based on the (preferably latest) information available in a spectrum inquiry messaging stream of the SCS 170. Such input classifications may comprise some or all of the following input classifications, as well as other input classifications suitable for use in adapting radio node operation in some manner so as to avoid interfering with an incumbent/priority user:

Input 1—Configuration Priority→Default, then numerically ascending with "1" being highest priority.

Input 2—Frequency Low→Lowest acceptable frequency to configure.

Input 3—Frequency High→Highest acceptable frequency to configure.

Input 4—Maintain Priority Access Channels→Rule to include specific channel type.

Input 5—Contiguity→Define whether or not channel configuration must be contiguous (e.g., must spectral region be a congruous block of spectrum).

Input 6—Defines if any power attenuation is allowed or if only full power is acceptable (e.g., transmit power).

Input 7—Sets total operational bandwidth for downlink/ (uplink) configuration.

Special Input 8—Recovery Period→Timer/clock (in seconds) to check for recovery to Default configuration or option for higher priority configuration (optionally, not separately included in the RCCPP table, but defined as a recovery period such as 120 minutes, 60 minutes, or some other amount of time).

TABLE 1

Radio Channel Configuration Priority Preference:

| Input 1 Priority | Input 2 Frequency Low | Input 3 Frequency High | Input 4 Maintain Priority Access Channels | Input 5 Contiguity | Input 6 Power | Input 7 Total Spectrum Bandwidth Target (MHz) |
|---|---|---|---|---|---|---|
| Default | 3630 | 3670 | Yes | Yes | Full | 40 |
| 1 | 3580 | 3700 | Yes | Yes | Full | 40 |
| 2 | 3580 | 3700 | Yes | No | Full | 40 |

TABLE 1-continued

Radio Channel Configuration Priority Preference:

| Input 1 Priority | Input 2 Frequency Low | Input 3 Frequency High | Input 4 Maintain Priority Access Channels | Input 5 Contiguity | Input 6 Power | Input 7 Total Spectrum Bandwidth Target (MHz) |
|---|---|---|---|---|---|---|
| 3 | 3580 | 3700 | Yes | Yes | <3 dB Reduced | 40 |
| 4 | 3580 | 3700 | Yes | No | <3 dB Reduced | 40 |
| 5 | 3550 | 3700 | Yes | Yes | Full | 40 |
| 6 | 3550 | 3700 | Yes | No | Full | 40 |
| 7 | 3550 | 3700 | Yes | Yes | <3 dB Reduced | 40 |
| 8 | 3550 | 3700 | Yes | No | <3 dB Reduced | 40 |
| 9 | 3580 | 3700 | Yes | Yes | Full | 30 |
| 10 | 3580 | 3700 | Yes | No | Full | 30 |
| 11 | 3580 | 3700 | Yes | Yes | <3 dB Reduced | 30 |
| 12 | 3580 | 3700 | Yes | No | <3 dB Reduced | 30 |
| 13 | 3550 | 3700 | Yes | Yes | Full | 30 |
| 14 | 3550 | 3700 | Yes | No | Full | 30 |
| 15 | 3550 | 3700 | Yes | Yes | <3 dB Reduced | 30 |
| 16 | 3550 | 3700 | Yes | No | <3 dB Reduced | 30 |
| 17 | 3580 | 3700 | Yes | Yes | Full | 20 |
| 18 | 3580 | 3700 | Yes | No | Full | 20 |
| 19 | 3580 | 3700 | Yes | Yes | <3 dB Reduced | 20 |
| 20 | 3580 | 3700 | Yes | No | <3 dB Reduced | 20 |
| 21 | 3550 | 3700 | Yes | Yes | Full | 20 |
| 22 | 3550 | 3700 | Yes | No | Full | 20 |
| 23 | 3550 | 3700 | Yes | Yes | <3 dB Reduced | 20 |
| 24 | 3550 | 3700 | Yes | No | <3 dB Reduced | 20 |
| 25 | 3580 | 3700 | No | Yes | Full | 40 |
| 26 | 3580 | 3700 | No | No | Full | 40 |
| 27 | 3580 | 3700 | No | Yes | <3 dB Reduced | 40 |
| 28 | 3580 | 3700 | No | No | <3 dB Reduced | 40 |
| 29 | 3550 | 3700 | No | Yes | Full | 40 |
| 30 | 3550 | 3700 | No | No | Full | 40 |
| 31 | 3550 | 3700 | No | Yes | <3 dB Reduced | 40 |
| 32 | 3550 | 3700 | No | No | <3 dB Reduced | 40 |
| 33 | 3580 | 3700 | No | Yes | Full | 30 |
| 34 | 3580 | 3700 | No | No | Full | 30 |
| 35 | 3580 | 3700 | No | Yes | <3 dB Reduced | 30 |
| 36 | 3580 | 3700 | No | No | <3 dB Reduced | 30 |
| 37 | 3550 | 3700 | No | Yes | Full | 30 |
| 38 | 3550 | 3700 | No | No | Full | 30 |
| 39 | 3550 | 3700 | No | Yes | <3 dB Reduced | 30 |
| 40 | 3550 | 3700 | No | No | <3 dB Reduced | 30 |
| 41 | 3580 | 3700 | No | Yes | Full | 20 |
| 42 | 3580 | 3700 | No | No | Full | 20 |
| 43 | 3580 | 3700 | No | Yes | <3 dB Reduced | 20 |
| 44 | 3580 | 3700 | No | No | <3 dB Reduced | 20 |
| 45 | 3550 | 3700 | No | Yes | Full | 20 |
| 46 | 3550 | 3700 | No | No | Full | 20 |
| 47 | 3550 | 3700 | No | Yes | <3 dB Reduced | 20 |
| 48 | 3550 | 3700 | No | No | <3 dB Reduced | 20 |

Various embodiments contemplate dynamic radio node reconfiguration, wherein a radio node is reconfigured so as to transition from a steady-state, optimal or initial configuration to various alternate prioritized configurations (e.g., as defined in the RCCPP table), and then to transition back to the optimal or initial configuration, or to a higher priority configuration than a current configuration.

Various elements or portions thereof depicted in FIG. 1 and having functions described herein are implemented at least in part as computing devices having communications capabilities, including for example the UE 105, RAN 150, gNB 151, SCS 170, DP 175, MS 180, nodes/functions of the core network 110, and so on. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

For example, various embodiments are implemented using network equipment used to implement network functions at a network core, network equipment comprising processing resources (e.g., one or more servers, processors and/or virtualized processing elements or compute resources) and non-transitory memory resources (e.g., one or more storage devices, memories and/or virtualized memory elements or storage resources). These processing and memory resources (e.g., compute and memory resources configured to form a 5G core) may be configured to stored and execute software instructions to provide thereby various functions in accordance with the embodiments.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
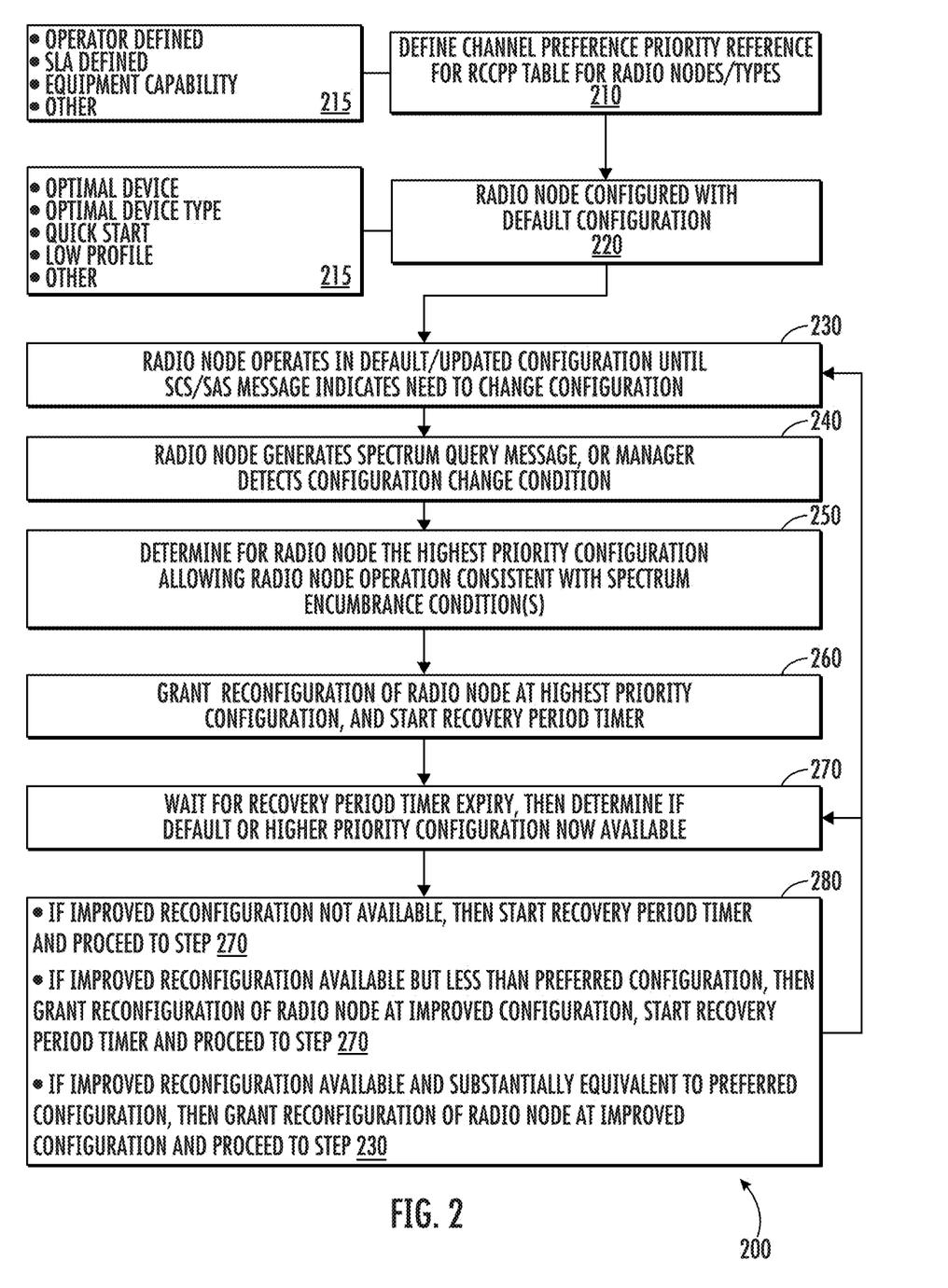
FIG. 2 depicts a flow diagram of a method according to an embodiment.

FIG. 2 depicts a flow diagram of a dynamic radio node configuration method according to an embodiment. Specifically, FIG. 2 depicts a flow diagram of a method by which a configuration of a radio node such as a base station, eNB, gNB, RAN and/or portion thereof using tiered-access or encumbered spectrum is automatically and dynamically maintained at a currently preferred configuration level.

That is, various embodiments contemplate that a radio node is reconfigured so as to transition from a steady-state, optimal or initial configuration to various alternate prioritized configurations (e.g., as defined in the RCCPP table), and then to transition back to the optimal or initial configuration, or to a higher priority configuration than a current configuration.

At step 210, a Radio Channel Configuration Priority Preference (RCCPP) table such as discussed above (or similar data structure/function) is generated for each individual radio node, type of radio node, or device identified as using tiered-access spectrum within the network of interest or portion thereof. The RCCPP table for a radio node may be generated in response to discovery or initialization of the radio node (e.g., after a power on or initialization sequence of the radio node). The RCCPP table may be generated only for those radio nodes in a specific geographic area, such as near a military base or other potential source of incumbent/priority users of the tiered-access spectrum of interest. Referring to box 215, the RCCPP table may be operator defined, SLA defined, equipment capability defined, and/or a combination of these or other factors suitable for use in determining the priority order of the configurations of the table or other data structure.

At step 220, each base station, eNB, gNB, or other radio node is initially configured to or with a Default Configuration. Referring to box 225, the Default Configuration is preferably an optimal steady-state configuration for the device or device type, though it may be a less than optimal configuration such as, for example, a "quick start" configuration (based on radio node capabilities or other system parameters), a low profile configuration (limited range), or some other configuration.

At step 230, each base station, eNB, gNB, or other radio node operates in the default configuration (or an updated configuration) until a spectrum encumbrance condition exists, such as indicated by SCS (e.g., SAS) message(s) indicative of a need to change the operating configuration is received. One example of messages indicative of a spectrum encumbrance condition comprises messages indicative of activation of a Dynamic Protection Area (DPA), wherein commercial wireless operations within a defined geographic area must cease radio transmission on certain channels and/or move to other available channels. For example, an SAS message may be transmitted to a RAN 150 for directing a particular radio node (e.g., a gNB) to vacate a default radio configuration due to an encumbrance. The RAN 150 may also be configured to forward SCS/SAS messages to the MS 180 for evaluation/processing.

At step 240, in response to an indication that a default radio channel configuration (RCC) of a radio node may not be used to configure the radio node (e.g., due to the existence of a spectrum encumbrance condition), a priority ranking of RCCs for the radio node is used to determine for the radio node a current highest priority RCC of the radio node that may be used to configure the radio node and support radio node operation utilizing the tiered-access spectrum. This determination may be made by the MS 180, SCS 170, RAN 150 (or 4G/LTE network), the radio node itself, or any other suitable entity. For example, the radio node may generate a spectrum inquiry message for the network manager, management system, SCS, or other relevant element.

Alternatively, a spectrum inquiry process may be invoked by the network manager (or other relevant element) in response to detecting that a configuration change condition exists with respect to the radio node (e.g., by monitoring SCS messages until a message indicative of a spectrum encumbrance condition is detected). For example, a RAN 150 may transmit a spectrum availability request to the SCS/SAS which, in response, will transmit to the RAN a message indicating per channel conditions across the full band of frequencies of interest. That is, the a current spectrum encumbrance condition may be determined by a Spectrum Coordination System (SCS) in response to a spectrum availability request transmitted by the (R)AN toward the SCS. The spectrum availability request may be transmitted by the (R)AN periodically or in response to the (R)AN determining that an encumbrance condition may exist or is scheduled to occur.

At step 250, a determination is made as to the highest priority configuration of the radio node that will allow operation consistent with the spectrum encumbrance condition(s). For example, the spectrum inquiry process may determine available channels and operating conditions across the frequency band or spectrum of interest for the radio node. A comparison may be made between the inputs in the relevant RCCPP table to identify the highest priority configuration option which available to the radio node that is consistent with the radio node avoiding interference with incumbent/priority usage of the spectrum.

At step 260, the identified highest priority configuration of the radio node is granted or otherwise invoked at the radio node to thereby reconfigure operation of the radio node, and a recovery period timer is started. For example, a RAN may obtain a Grant and set a radio node (e.g., gNB) to the highest priority configuration consistent with the Grant. The radio node is configured to update its use of unencumbered spectrum without being initialized At step 270, upon expiry of the recovery timer period a determination is made as to whether the default configuration or a configuration higher than the present configuration of the radio node is available. That is, given the current configuration of the radio node and the current extent of the spectrum encumbrance condition(s), is an improved configuration (e.g., higher up the RCCPP table than the current configuration) now available to the radio node that is consistent with the radio node avoiding interference with incumbent/priority usage of the spectrum. Step 270 may be implemented in a manner similar to that of step 240. That is, the radio node may generate a spectrum inquiry message for the network manager, SCS, or other relevant element. Alternatively, a spectrum inquiry process is invoked in response to the network manager (or other relevant element) detecting that a configuration change condition exists with respect to the radio node (e.g., by monitoring SCS messages until a message indicative of a spectrum encumbrance condition is detected). For example, a RAN 150 may transmit a spectrum availability request to the SCS/SAS which, in response, will transmit to the RAN a message indicating per channel conditions across the full band of frequencies of interest.

At step 280, if an improved configuration of the radio node is not available, then the recovery period timer is restarted and the method 200 proceeds to step 270. If an improved configuration of the radio node is available, then the improved configuration of the radio node is granted or otherwise invoked at the radio node to thereby reconfigure operation of the radio node. If the improved configuration is not the preferred configuration (e.g., top of RCCPP, default, initial, or other configuration), then the recovery period timer is started and the method 200 proceeds to step 270. If the improved configuration is substantially equal to the preferred configuration, then the method 200 proceeds to step 230.

In various embodiments, at the end of each Recovery Period timeout (steps 270-280), the radio node or RAN will communicate with the SCS/SAS via spectrum inquiry to see if the Default Configuration is now available. If so, the Default Configuration is restored and the Recovery Period Timer is disabled. If not, the radio node or RAN will compare the spectrum inquiry response from the SAS to determine if a higher priority configuration option is available. If so, Grant Approval of the higher priority configuration will be sought and, if approved, implemented by the radio node or RAN. In various embodiments, as long as the Default Configuration is not available, the Recovery Period Timer restarts to ensure a periodic inquiry with a goal of eventual return of the radio node or RAN to the Default Configuration or a higher priority configuration than a current configuration.

Advantageously, the various embodiments avoid a situation wherein a base station radio, radio node, RAN, and the like may be directed to power down until further notice, or be caused to operate using an arbitrary configuration which is neither optimal nor preferred by the base station operator.

Various embodiments contemplate that a base station, eNB, gNB, or other radio node is initially configured to or with a Default Configuration, which Default Configuration is preferably a steady-state configuration though it may be a less than optimal configuration such as, for example, a "quick start" configuration or other configuration. The radio node proceeds with normal operation until SCS/SAS messaging indicates that the Default Configuration is not possible, whereupon the radio node uses a spectrum inquiry process to determine available channels and operating conditions across the frequency band or spectrum of interest. A spectrum inquiry response is compared to the inputs in the RCCPP table to make a determination identifying the highest priority configuration option which is available to the radio node, consistent with the radio node avoiding interference with incumbent/priority usage of the spectrum. The highest priority configuration is implemented once a Grant Approval is received and the Recovery Period Timer begins.

At the end of each Recovery Period timeout, the radio node or RAN will communicate with the SCS/SAS via spectrum inquiry to see if the Default Configuration is now available. If so, the Default Configuration is restored and the Recovery Period Timer is disabled. If not, the radio node or RAN will compare the spectrum inquiry response from the SAS to determine if a higher priority configuration option is available. If so, Grant Approval of the higher priority configuration will be sought and, if approved, implemented by the radio node or RAN. In various embodiments, as long as the Default Configuration is not available, the Recovery Period Timer restarts to ensure a periodic inquiry with a goal of eventual return of the radio node or RAN to the Default Configuration or a higher priority configuration than a current configuration.

Advantageously, the various embodiments avoid a situation wherein a base station radio, radio node, RAN, and the like may be directed to power down until further notice, or be caused to operate using an arbitrary configuration which is neither optimal nor preferred by the base station operator.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for dynamically configuring wireless devices using encumbered spectrum, comprising:
   establishing, for a radio node configured to use encumbered spectrum, a priority ranking of radio channel configurations (RCCs);
   granting encumbered spectrum for use by the radio node in accordance with a default RCC;
   in response to a current spectrum encumbrance condition, determining a current highest priority RCC for the radio node capable of supporting radio node operation in accordance with the current encumbrance condition;
   granting encumbered spectrum for use by the radio node in accordance with the determined highest priority RCC; and
   periodically determining a current highest priority RCC for the radio node capable of supporting radio node operation in accordance with a current encumbrance condition, and granting encumbered spectrum for use by the radio node in accordance with the determined highest priority RCC.

2. The method of claim 1, wherein the radio node comprises a gNB of a radio access network (RAN) in a 5G network.

3. The method of claim 2, wherein a current spectrum encumbrance condition is determined by a Spectrum Coordination System (SCS) in response to a spectrum availability request transmitted by the RAN toward the SCS.

4. The method of claim 3, wherein the spectrum availability request is configured to cause the SCS to transmit toward the RAN a message indicating per channel conditions across a full band of frequencies of interest.

5. The method of claim 1, wherein the radio node comprises a 4G/LTE eNB.

6. The method of claim 1, further comprises receiving, at the radio node, a message from a Spectrum Coordination System (SCS) indicative of a current spectrum encumbrance condition.

7. The method of claim 6, wherein granting encumbered spectrum for use by the radio node comprises receiving a spectrum grant message from the SCS.

8. The method of claim 7, wherein the SCS comprises a Spectrum Access System (SAS) administering citizens broadband radio service (CBRS) spectrum to Citizens Broadband Radio Service Devices (CBSDs).

9. The method of claim 1, wherein the default RCC comprises a preferred RCC.

10. The method of claim 1, wherein the default RCC comprises one of a quick start RCC and a low profile configuration RCC.

11. The method of claim 1, wherein the RCCs are stored in priority order in a Radio Channel Configuration Priority Preference (RCCPP) table.

12. The method of claim 1, wherein the radio node is configured to update its use of unencumbered spectrum without being initialized.

13. The method of claim 1, wherein each RCC defines for a radio node a lowest acceptable frequency to configure and a highest acceptable frequency to configure.

14. The method of claim 13, wherein each RCC further defines for the radio node a total amount of bandwidth to configure.

15. The method of claim 13, wherein each RCC further defines whether the frequencies used by the radio node must be contiguous.

16. The method of claim 13, wherein each RCC further defines for the radio node an acceptable level of power attenuation by the radio node.

17. The method of claim 1, wherein the method is performed by a network management system (NMS), element management system (EMS), Operations Support System (OSS), or radio access network (RAN).

18. A network management system (NMS) for managing radio node configuration in a wireless network utilizing tiered-access spectrum, the NMS comprising:
  a domain proxy (DP), configured to support communications between deployed radio nodes and a Spectrum Coordination System (SCS) administering the tiered-access spectrum; and
  the NMS, in response to an indication that a default radio channel configuration (RCC) of a radio node may not be used to configure the radio node, using a priority ranking of RCCs to determine for the radio node a current highest priority RCC of the radio node that may be used to configure the radio node and support radio node operation utilizing the tiered-access spectrum, and transmitting toward the radio node a message indicative of the determined current highest priority RCC, the message indicative of the determined current highest priority RCC being configured to cause the radio node to request a corresponding spectrum grant from the SCS administering the tiered-access spectrum.

19. The NMS of claim 18, wherein the message indicative of the determined current highest priority RCC being further configured to cause the radio node to update its use of unencumbered spectrum without being initialized.

20. A computer implemented management system (MS) for managing radio node configuration in a wireless network utilizing tiered-access spectrum, the MS comprising compute and memory resources configured for:
  in response to an indication that a default radio channel configuration (RCC) of a radio node may not be used to configure the radio node, using a priority ranking of RCCs to determine for the radio node a current highest priority RCC of the radio node that may be used to configure the radio node and support radio node operation utilizing the tiered-access spectrum; and
  transmitting, toward the radio node, a message indicative of the determined current highest priority RCC and configured to cause the radio node to request a corresponding spectrum grant from a Spectrum Coordination System (SCS) administering the tiered-access spectrum.

* * * * *